Patented Aug. 26, 1941

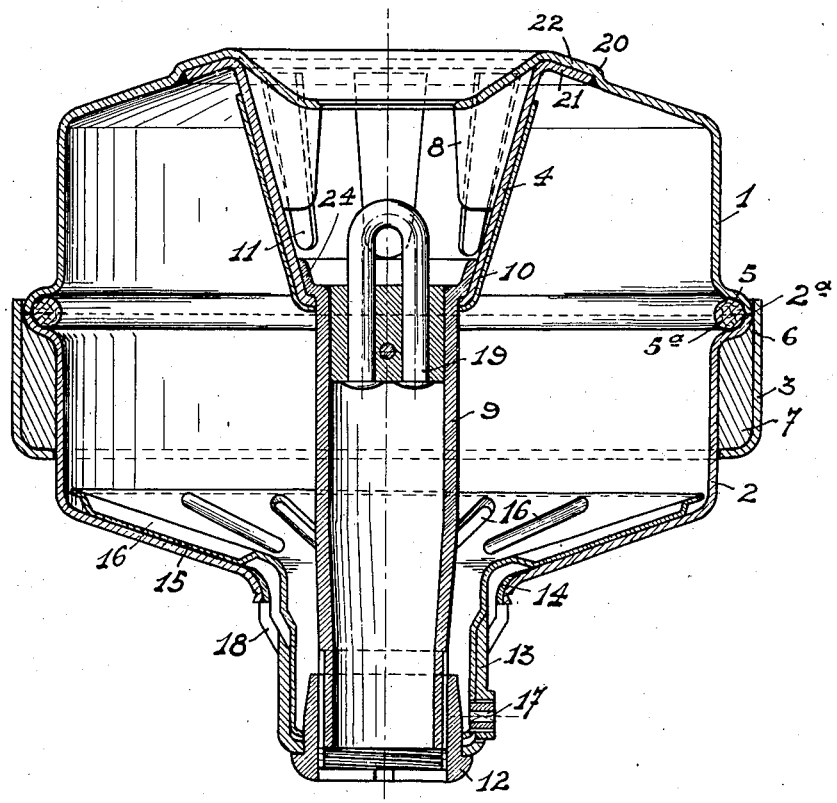

2,253,647

UNITED STATES PATENT OFFICE 2,253,647

CREAM SEPARATOR

Jules Persoons and Alphonse Persoons, Thildonck, Belgium

Application April 12, 1938, Serial No. 201,484
In Belgium April 17, 1937

1 Claim. (Cl. 233—27)

Our invention relates to a centrifugal bowl or drum for cream separators and the like and more particularly to a freely suspended centrifugal bowl or drum.

It has for its object to provide a centrifugal bowl or drum of strong construction and smooth running, while using for its manufacturing only an assembly made of thin sheet metal and allowing the use of expensive and long lasting metals, such as stainless metals without great increase of the cost price of the centrifugal bowl or drum.

According to the invention, the centrifugal bowl or drum which is made of sheet metal and preferably of stainless steel or another stainless metal is provided at its outer periphery with a fly-wheel, known per se, comprising a double wall, usually of the same material as the centrifugal bowl or drum, which provides a space for the reception of a mass of a cheaper material.

In practice said mass is of a metal such as zinc or cast iron.

Other objects and features of this invention will appear in the following description referring to the accompanying drawing which shows in vertical section an embodiment of said invention.

The centrifugal bowl or drum making the subject matter of the invention comprises essentially a receiver or vessel having an upper part or cover 1 and a lower part or body 2.

Both parts are made of stamped sheet metal and preferably of stainless steel.

Around the upper part of the body 2 there is provided a ring 3, usually of the same material as parts 1 and 2 and forming, as shown in 2a, a fitting space for cover 1 which at the corresponding place is provided with an enlarged rounded edge 5 joining a similar rounded edge 6 of body 2.

These enlarged rounded edges provide a space which receives a tight packing 5a.

Inside of the space formed by body 2 and ring 3, there is a mass 7 of a cheap metal or alloy which is introduced into said space and which with ring 3 actuates as a fly-wheel. Said cheaper material of which mass 7 is formed should be selected so as to have about the same specific gravity as the remainder of the centrifugal bowl or drum.

The chamber 4 into which the milk enters is provided with blades 8, of steel or another material, which impart rotation to the milk and on the bottom of said chamber a central tube 9 of sheet metal or another metal is secured as by soldering and serves to connect both parts 1 and 2.

A conical sleeve 10 of stamped steel or another suitable material is located on the outside of room 4 and allows the milk to pass from room 4 into the centrifugal bowl through the upper part of openings 11 formed in said room.

A nut 12 is screwed on the lower outside threaded end of tube 9, which nut acts also upon a room 13, preferably of sheet metal, provided for the outlet of the skim-milk and the cream.

Said room is secured to part 2 as by insertion and force fitting or setting in as shown in 14. In the drawing, 15 indicates the stamped false bottom of sheet metal and 16 projections stamped in the false bottom 15 which rests by means of said projections, upon the bottom of the centrifugal bowl. In said drawing, 17 is the outlet opening for the cream; it can be controlled by means of a screw thread arrangement, 18 is one of the skim-milk outlets, of which there are for example four, and 19 the suspension eyelet of the centrifugal bowl.

As can be seen, this centrifugal bowl, although made entirely of sheet-metal—requiring the use of only small amounts of raw materials—gives nevertheless all guarantee of smooth running, strength and safety due to the fly-wheel, which as above mentioned is made almost entirely of cheap materials such as zinc, cast iron or the like. The upper edge of ring 3 acts at the same time as a guide for inserting cover 1 into place, while the hollow space afforded by the enlarged rounded edges 5 and 6 allows the placing therein of a rubber band securing a tight joint.

Furthermore the assembly of the outlet room 13 with the body of the centrifugal bowl as by inserting and force fitting, allows a more regular and easier stamping of body 2 as well as the stamping of the room with a heavier gauge material than the casing which gives a greater strength to this room. Finally the assembly of central tube 9 with entrance room 4 by welding allows to center satisfactorily both parts 1 and 2 and to connect them rigidly while using only a small amount of metal.

The cover 1 may be reinforced by a flange formed on the chamber 4 and fitting into an annular raised portion 22 of the cover. This arrangement permits the cover to resist the liquid pressure produced by the centrifugal force.

Preferably, the upper end of the central tube 9 is in contact with the lower portion of the room 4 to which it is welded on a rather important distance.

What we claim it is:

In a cream separator, a sheet metal drum, comprising a body part having an outwardly flared upper rim and a cover part resting on and being secured to said bottom part, said cover part having an outwardly flared lower rim fitting against said outwardly flared upper rim of the bottom part to form therewith an inwardly open annular groove of substantially trough-shaped cross-section and being provided with a split along its circumference, a sheet metal ring surrounding the upper portion of said body part at a uniform distance therefrom, the upper edge of said ring being in contact with and projecting above the upper outwardly flared rim of said body part to form a guide for the outwardly flared lower rim of the cover part when the latter is placed on the body part, a mass of material which can be easily worked, said mass filling the space between said ring and upper portion of the body part of the drum, and an annular gasket of elastic material provided in said drum to be pressed into said groove and against said split by the centrifugal force when the separator is running.

JULES PERSOONS.
ALPHONSE PERSOONS.